United States Patent
Kumar et al.

(10) Patent No.: US 10,776,713 B2
(45) Date of Patent: Sep. 15, 2020

(54) CLASSIFICATION OF HIGHLY-SKEWED DATA

(71) Applicant: Regents of the University of Minnesota, Minneapolis, MN (US)

(72) Inventors: Vipin Kumar, Minneapolis, MN (US); Varun Mithal, Minneapolis, MN (US); Guruprasad Nayak, Minneapolis, MN (US); Ankush Khandelwal, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 1013 days.

(21) Appl. No.: 15/137,603

(22) Filed: Apr. 25, 2016

(65) Prior Publication Data

US 2016/0314411 A1    Oct. 27, 2016

Related U.S. Application Data

(60) Provisional application No. 62/152,257, filed on Apr. 24, 2015.

(51) Int. Cl.
*G06N 99/00* (2019.01)
*G06K 9/62* (2006.01)
(Continued)

(52) U.S. Cl.
CPC .................................... *G06N 20/00* (2019.01)

(58) Field of Classification Search
CPC .......... G06N 20/00; G06N 99/00; G06N 5/04; A61K 31/44; G06Q 10/10
(Continued)

(56) References Cited

U.S. PATENT DOCUMENTS

| | | | |
|---|---|---|---|
| 8,225,402 B1 * | 7/2012 | Averbuch | G06F 21/554 717/141 |
| 2005/0008228 A1 * | 1/2005 | Chapoulaud | G01N 15/1429 382/224 |

(Continued)

OTHER PUBLICATIONS

Agarwal et al., PNrule: A New Framework for Learning Classifier Models in Data Mining (A Case-Study in Network Intrusion Detection), SIAM, pp. 1-22, 2000.
(Continued)

*Primary Examiner* — Brandon S Cole
(74) *Attorney, Agent, or Firm* — Theodore M. Magee; Westman, Champlin & Koehler, P.A.

(57) ABSTRACT

A method for identifying highly-skewed classes using an imperfect annotation of every instance together with a set of features for all instances. The imperfect annotations designate a plurality of instances as belonging to the target rare class and others to the majority class. First, a classifier is trained on the set of features using the imperfect annotation as supervision, to designate each instance to either the rare class or majority class. A combination of the predictions from the trained classifier and the imperfect annotations is then used to classify each instance to either the rare class or majority class. In particular, an instance is classified to the rare class only when both the trained classifier and the imperfect annotation classify the instance to the rare class. Finally, for each instance assigned as a rare class instance by the combination stage, all instances in its neighborhood are re-classified as either rare class or majority class.

20 Claims, 4 Drawing Sheets

(51) Int. Cl.
*C40B 20/00* (2006.01)
*A61K 31/44* (2006.01)
*G06Q 20/00* (2012.01)
*G06Q 10/10* (2012.01)
*G06N 20/00* (2019.01)

(58) Field of Classification Search
USPC .................................................... 706/1–62
See application file for complete search history.

(56) References Cited

U.S. PATENT DOCUMENTS

| | | | | |
|---|---|---|---|---|
| 2005/0065418 | A1* | 3/2005 | Ginor | A61B 5/0536 600/345 |
| 2012/0058198 | A1* | 3/2012 | Clarke | A61K 9/0075 424/602 |
| 2012/0208706 | A1* | 8/2012 | Downing | C12Q 1/6874 506/2 |
| 2012/0232927 | A1* | 9/2012 | Larruga | G06F 19/3418 705/3 |
| 2013/0231258 | A1* | 9/2013 | Wilde | C12Q 1/6879 506/9 |
| 2015/0278603 | A1* | 10/2015 | Boriah | G06K 9/6218 382/103 |
| 2016/0132786 | A1* | 5/2016 | Balan | G06N 20/00 706/12 |

OTHER PUBLICATIONS

Ahmad et al., Guilt by Association? Network Based Propagation Approaches for Gold Farmer Detection, IEEE/ACM International Conference on Advances in Social Networks Analysis and Mining, pp. 121-126, 2013.
Bowman et al., Fire in the Earth System, Science, vol. 324, No. 5926, pp. 481-484, 2009.
Chapelle et al., Semi-Supervised Learning, vol. 2, MIT press Cambridge, pp. 1-31, 2006.
Chawla et al., SMOTE: Synthetic Minority Over-Sampling Technique, Journal of Artificial Intelligence Research, vol. 16, pp. 321-357, 2002.
Chen et al., A New Data Mining Framework for Forest Fire Mapping, Conference on Intelligent Data Understanding, pp. 104-111, 2012.
Evgeniou et al., Regularized Multi-Task Learning, In Proceedings of the tenth ACM SIGKDD International Conference on Knowledge Discovery and Data Mining, pp. 109-117, ACM, 2004.
He et al., Rare Class Classification by Support Vector Machine, In Pattern Recognition (ICPR), 2010 20th International Conference, pp. 548-551, IEEE, 2010.
Justice, et al., MODIS-Derived Global Fire Products, Lad Remote Sensing and Global Environmental Change, pp. 561-679, Springer, 2011.
Liu et al., A Spatial-Temporal Modeling Approach to Reconstructing Land-Cover Change Trajectories from Multi-temporal Satellite Imagery, Annals of the Association of American Geographers, vol. 102, No. 6, pp. 1329-1347, 2012.
Land Processes Distributed Active Archieve Center, http://lpdaacusgs.gov., 2014.
Menon et al., Learning from Corrupted Binary Labels via Class-Probability Estimation, Proceedings of the 32nd International Conference on Machine Learning, vol. 37, 10 pages, 2015.
Mithal et al., Monitoring Global Forest Cover Using Data Mining, ACM Transactions on Intelligent Systems and Technology, vol. 2, No. 4, pp. A:2-A23, 2011.
Raykar et al., Learning from Crowds, Journal of Machine Learning Research, vol. 11, pp. 1297-1322, 2010.
Settles, Active Learning Literature Survey, University of Wisconsin-Madison, vol. 52, 67 pages, 2010.
Valizadegan, et al., Learning Classification Models from Multiple Experts, Journal of Biomedical Informatics, vol. 46, pp. 1125-1135, 2013.
Yan et al., Active Learning from Crowds, In Proceedings of the 28th International Conference on Machine Learning, pp. 1161-1168, 2011.

* cited by examiner

CLASSIFICATION OF HIGHLY-SKEWED DATA

CROSS-REFERENCE TO RELATED APPLICATION

The present application is based on and claims the benefit of U.S. provisional patent application Ser. No. 61/152,257, filed Apr. 24, 2015, the content of which is hereby incorporated by reference in its entirety.

This invention was made with government support under 1029711 awarded by the National Science Foundation (NSF), and NNX12AP37G awarded by the National Aeronautics and Space Administration (NASA). The government has certain rights in the invention

BACKGROUND

Altering computer systems so that the systems can correctly classify data without human assistance is difficult. Computer systems do not inherently understand the features of data that should cause the data to be classified in one class over another class. In addition, for many forms of data, the data set is too large to be classified by hand.

SUMMARY

A method of identifying which items in a collection of items belong to a rare class includes training a classifier based on annotations of data by a heuristic rule. The annotations designate a plurality of items as being either a rare class or a majority class. A combination of the trained classifier and a second classifier are then used to classify a further plurality of items based on data. An item is classified in the rare class by the combination of the trained classifier and the second classifier only when both the trained classifier and the second classifier classify the item in the rare class. For each item classified in the rare class by the combination of the trained classifier and the second classifier, all items that are connected to the item in the rare class are reclassified as either being in the rare class or the majority class.

In accordance with a further embodiment, a method of improving computer-based classification of highly skewed data is provided. The method includes receiving highly skewed data comprising members that are in either a first class or a second class. The data is highly skewed because the ratio of the number of members in the first class to the number of members in the second class is sometimes greater than one hundred. Each member in the highly skewed data is classified using two separate classifiers such that a member is classified in the second class only if both classifiers place the member in the second class. Connections between the members are identified and each member connected to a member classified in the second class is reclassified as either being in the first class or the second class.

In a still further embodiment, a computing device includes a memory storing values for a plurality of objects and a processor performing steps. The steps include assigning imperfect labels to at least some of the plurality of objects and training a classifier based on the imperfect labels. Each object is then classified using the trained classifier and a second classifier and for each object classified in a first class, a connected object is identified and is reclassified.

DETAILED DESCRIPTION

Figure 1:
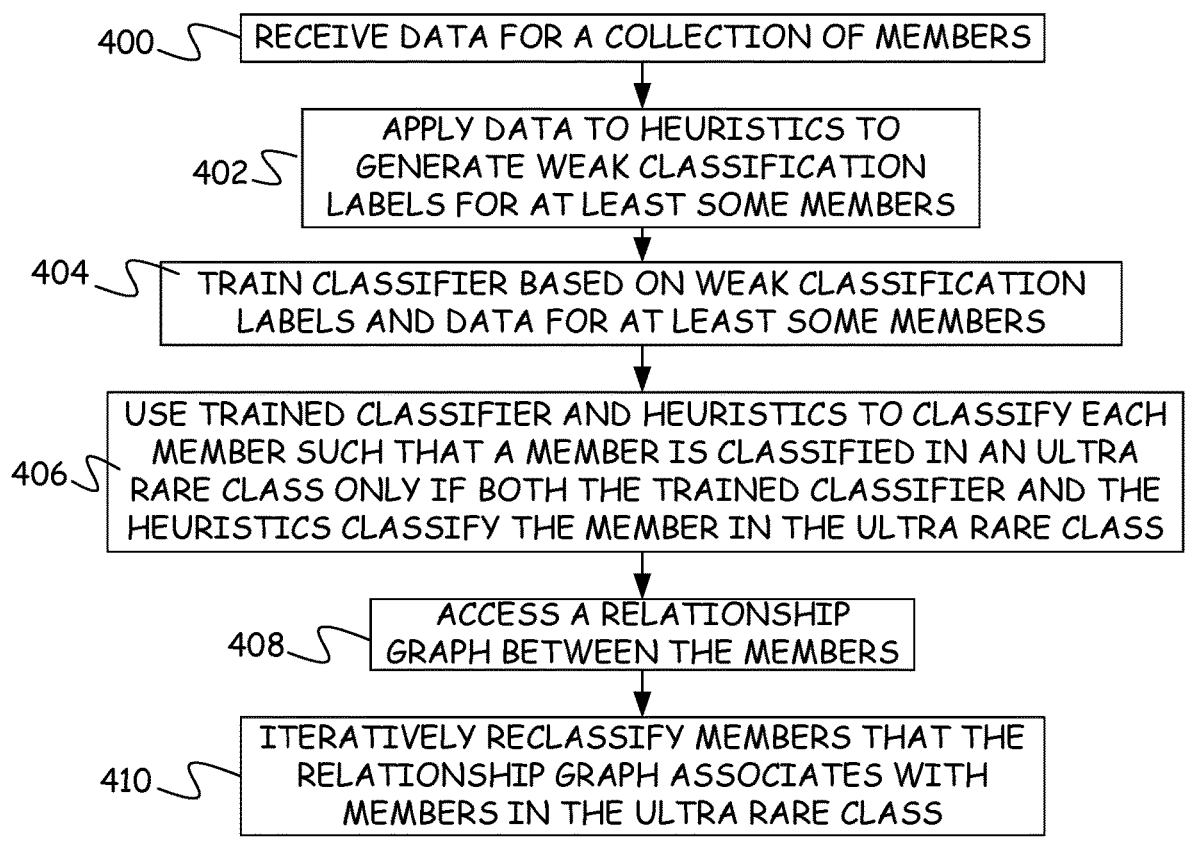
FIG. 1 is a flow diagram of a method of classifying highly skewed data in accordance with one embodiment

The challenging problem of rare class mining is inevitable in many real-world data mining applications, such as network intrusion detection, video surveillance, land cover change identification in satellite images, diagnoses of rare medical conditions, and so on. All these applications share a common characteristic: samples from one class are extremely rare, while the number of samples belonging to other classes is sufficiently large. Furthermore, the correct detection of the rare samples is of significantly greater importance than the correct classification of the majority samples. As an example, consider the problem of classifying pixels of satellite images into burned/unburned category. This is an ultra-skew problem with the number of burned locations being only 0.01% of the total number of pixels in a satellite image. However, for the end-user it is important to correctly detect these 0.01% test instances.

The major challenge comes from the fact that the rarely occurring samples are usually overwhelmed by the majority class samples so that they are much harder to be identified by traditional machine learning approaches. Traditional machine learning algorithms usually aim at achieving the lowest overall misclassification rate, which creates an inherent bias in favor of the majority classes because the rare class has less impact on overall accuracy. In ultra-rare class problems such as disease detection, land cover change monitoring, and fraud identification, the algorithms are evaluated on the recall and precision of the positive class as the rare samples are of significantly greater importance. Since these classification models are tested on a large number of negative test instances, and even with a low false positive rate, the classifier produces a considerable number of spurious positives, which reduce the precision of the positive class. In fact as the skew between the classes increases, the precision degrades significantly even for modest values of recall. One way to address the issue of low precision is to use a more conservative threshold in the classification model so that the false positive rate is extremely low. But this comes at the cost of considerably reducing the recall as there is an inherent trade-off between the two. Thus, the goal of rare class mining framework is to achieve a high precision for ultra-rare class problems without compromising the recall.

In many predictive modelling tasks, the relationship between the explanatory variables and target variable varies for different partitions of the data which can be attributed to a number of factors. For example, in one embodiment, data characteristics of remotely sensed data vary with geographies, seasons and land cover. Learning a single global model, or applying a model trained on one partition on another heterogeneous partition leads to suboptimal performance. To demonstrate the impact of heterogeneity in the performance of the predictive models, we trained 4 separate models that distinguish urban class from non-urban class using training samples from different geographical regions. Each of these predictive models was then tested on all 4 geographical regions. Table 1 shows that the model trained using samples from the same geographical region has significantly better performance compared to the predictive models trained on samples from other geographical regions.

TABLE 1

The performance (F-measure) of models trained using samples from different geographical regions. The differences in the performance clearly illustrates the impact of heterogeneity.

| Train Test | Mexicali | Rochester | Santa Maria | Las Vegas |
|---|---|---|---|---|
| Mexicali | 0.73 | 0.01 | 0.07 | 0.58 |
| Rochester | 0.01 | 0.56 | 0.15 | 0 |
| Santa Maria | 0.28 | 0.03 | 0.39 | 0.13 |
| Las Vegas | 0.07 | 0.13 | 0.13 | 0.47 |

Thus, in order to learn predictive relationship in such heterogeneous datasets, a better approach is to first partition data into homogeneous groups (whose member instances show the same predictive relationship) and then learn separate customized models for each partition. However, partitioning the data creates multiple learning tasks each of which requires its own set of training samples. This considerably increases the human effort needed for acquiring a sufficient number of labeled instances. As an example, if we create homogeneous partitions based on land cover, season and spatial regions for global burned area monitoring around $10^4$ partitions are created. While some countries such as United States and Canada have fire monitoring programs that catalog the spatial extent and timing of burned areas, most countries in Asia, Africa and South America lack these capabilities. Thus, in 90-95% of the partitions we have absolutely no labeled instance for training purposes. Acquiring sufficient labeled samples using manual image inspection or ground survey in all $10^4$ partitions is infeasible. Moreover, rare objects are diverse and difficult to identify by human annotators and hence it is difficult to obtain a representative sample for training purposes.

In the present embodiments, a novel predictive framework is provided for ultra-rare classes in the complete absence of ground truth. The embodiments effectively address the challenges posed by lack of ground truth labeled samples and ultra-rare class distribution in a three step framework.

The first step learns predictive models in complete absence of ground truth for rare class problems. The key idea is that although labeling training instances may be difficult or prohibitively expensive, often domain experts can give simple heuristics (rules) that can be used on raw data to imperfectly label instances. These heuristics provide only "weak labels" that often disagree with the gold standard labels for those instances. Thus, by themselves, the "weak labels" cannot be directly used as predictions by the end-users. However, we provide a method to train high quality classifiers in the complete absence of "gold standard" labels using only "weak labels" for supervision, which under certain assumptions on the weak labels is expected to give comparable performance as classifier trained on expert-annotated samples. Thus, this step allows the embodiments to overcome the challenges posed by a lack of labeled data for training, especially due to heterogeneity.

The second step addresses the issue of low precision of rare class identification due to the ultra-skew in the classes by combining predictions from two classifiers trained on conditionally independent views. The idea is to flag only the most confident rare class test instances in this step, i.e. those instances which are predicted as positive in both views. At the end of this step the identified rare class test instances are expected to have an extremely high precision but may have a poor recall. In one embodiment, the weak labels can themselves serve as the second set of predictions, thus overcoming the need for a second view (sufficient, conditionally independent feature space).

The third step leverages a guilt-by-association property to improve the coverage (recall) of the rare class. More specifically, in this step, the test instances connected to confident rare class instances identified in the second step are further probed and added to the rare class set if they satisfy some minimum criteria. This label propagation step helps in overcoming the issue of poor recall in the second step by allowing the rare class instances missed in the second step to be added back to the rare class output.

Some embodiments combine the strengths of the innovations in these three steps to solve important rare class problems such as mapping of urban areas and burned areas from satellite data, which are of immense societal interest.

Below we present the three steps of the embodiments in detail. Section 1 discusses the training algorithm for training predictive models for rare class problems using weak labels, which are comparable to models trained using gold standard labels. We provide the theoretical proofs as well as the experimental evidence to demonstrate that under mild assumptions on weak labels, the performance of classification model trained using weak labels is comparable to the model trained using gold standard labels. Section 2 describes the second step of some embodiments that identifies extremely confident positive test instances by combining predictions from two sources. We show that the precision of the positive class on the test set can be significantly improved using this step. Finally, Section 3 explains how some embodiments leverage a guilt-by-association principle to improve coverage of the rare class by label propagation along an association graph.

Section 1—Training Classifiers in Absence of Truth

Classification Model—

The proposed method can be used for any classifier that can model $Pr[y=1|x, w]$ or some monotonic function $g(x)$ of this conditional probability.

The final classifier can be written in the following form: $y=1$ if $g(x) \geq \gamma$ and 0 otherwise. The threshold $\gamma$ determines the operating point of the classifier. The Receiver Operating Characteristic (ROC) curve is obtained as $\gamma$ is swept from $-\infty$ to $\infty$. Typically, the threshold $\gamma$ is fixed such that it maximizes the evaluation metric on a validation set, which has a similar data distribution as the test set. For example, if the objective is to maximize the overall classification accuracy, the accuracy of the validation set corresponding to different values of threshold $\gamma$ is evaluated and the value of $\gamma$ that maximizes the accuracy of the validation set is chosen. In some embodiments, we select the operating point $\gamma$ that maximizes the product of precision and recall.

Learning with Ground Truth Labels—

When ground truth labels are available, training is simplified because we are given training samples $(x, y)_n$, where x is feature vector and y is ground truth label. The goal is to a learn a function $f: x \rightarrow y$ and threshold $\gamma$ such that $(f, \gamma)$ maximizes the product of precision and recall on the test set.

Algorithm to learn function $f$:

Learn $f$: Train a function using the training set $(x, y)_n$.

Fix $\gamma$: Find the threshold $\gamma$ such that the product of precision and recall is a maximum for that threshold.

Learning with Weak Labels:

In the present embodiments, we cannot estimate $(f, \gamma)$ since we do not have access to ground truth labels y. To overcome the challenge posed by lack of ground truth data, we propose an alternative learning task based on weak labels. We are given training samples $(x, a)_n$, where x is a feature vector and a is a weak label. Weak labels are derived using some heuristic and are imperfect, i.e. can make errors on both positive and negative training instances.

In the various embodiments, we want to train a classifier using a. The goal is to learn a function $g:x \rightarrow a$ and threshold $\gamma_g$ such that $(g, \gamma_g)$ maximizes the product of precision and recall.

Since learning algorithms for most classifiers are robust to presence of some degree of label noise, if a are only a small perturbation of y, it is possible to learn function $(f, \gamma)$ by ignoring the fact that the given labels are noisy. Our focus is on situations where this naively constructed classifier fails.

Mathematical Relationship Between $f$ and $g$—

In this section we establish a mathematical relationship between the target function $f$, learned using ground truth, and function g, learned from weak labels.

Under the following two conditions (1) $Pr(a=0|y=0) > Pr(a=1|y=1)$ and (2) a is independent of x given y, the target function $f(x)$, is a monotonically increasing linear function of $g(x)$.

Proof $g(x) = Pr(a = 1 | x) =$ $1 - Pr(a = 0 | x) = 1 - Pr(a = 0 \cap y = 0 | x) - Pr(a = 0 \cap y = 1 | x)$ Applying the chain rule we get =

$1 - Pr(a = 0 | y = 0, x)Pr(y = 0 | x) - Pr(a = 0 | y = 1, x)Pr(y = 1 | x)$

Assuming a is independent of x given y we get =

$1 - Pr(a = 0 | y = 0)Pr(y = 0 | x) - Pr(a = 0 | y = 1)Pr(y = 1 | x) =$ $1 - Pr(a = 0 | y = 0)(1 - Pr(y = 1 | x)) - Pr(a = 0 | y = 1)Pr(y = 1 | x)$

Substitution of $f(x) = 1 - Pr(a = 0 | y = 0)(1 - f(x)) -$ $Pr(a = 0 | y = 1)f(x)$ Hence, $f(x)$ can be written as a linear function of $g(x)$ given by:

$$f(x) = \frac{Pr(a = 0 | y = 0) - 1}{Pr(a = 0 | y = 0) - Pr(a = 0 | y = 1)} + \frac{g(x)}{Pr(a = 0 | y = 0) - Pr(a = 0 | y = 1)}$$

If $Pr(a=0|y=0) > Pr(a=0|y=1)$ then $f(x)$ is a monotonically increasing function of $g(x)$. As a result of this monotonic relationship the ranking of instances in a test set sorted by $f(x)$ will be identical to that produced by $g(x)$. Note that the perfect correlation exists only if $f(x)=Pr(y=1|x)$ and $g(x)=Pr(a=1|x)$. However, this equality rarely holds true in practice because $f$ and g are trained on finite training samples, and/or the family of models that g is selected from (in our case sigmoid function) does not include the true model. Hence, the rankings are expected to be comparable and not necessarily identical in practice.

We also prove that under the following two conditions (1) $P(a=1|y=1) > P(a=1|y=0)$ and (2) a is independent of x given y, the relationship between the true precision and estimated precision (according to imperfect labels a) for a threshold on $g(x)$ is given as $$P(y = 1 | g(x) > \gamma) = \frac{P(a = 1 | g(x) > \gamma) - P(a = 0 | y = 1)}{P(a = 0 | y = 0) - P(a = 0 | y = 1)}$$

Finally, we prove that the threshold on $g(x)$ that maximizes the product of precision and recall (and hence the geometric mean of precision and recall) is given by maximizing the following expression $$[P(a=1|g(x)>\gamma) - P(a=0|y=1)]^2 P(g(x)>\gamma)$$

We estimate $P(a=1|g(x)>\gamma)$, $P(a=0|y=1)$, and $P(g(x)>\gamma)$ using a validation data set (with only imperfect annotations) and select the threshold value that maximizes the product of precision and recall.

Section 2—Combining Multiple Predictions

Classification based approaches cannot be directly applied in domains where the class of interest is ultra-rare. Consider a data set for which we are given a large number of representative labeled samples of both classes and the positive and negative class samples can be separated with a high sensitivity and specificity using the given feature vectors. Let the probability of misclassifying a positive class sample in this data set be $\epsilon_1$ and probability of misclassifying a negative class sample be $\epsilon_2$. Note that in most applications, given a rich feature set it may be possible to achieve a very small $\epsilon_1$ and $\epsilon_2$. However, due to noise and variability in data, an "ideal" classifier, where both $\epsilon_1$ and $\epsilon_2$ are 0, is infeasible.

For concreteness, let us consider a classifier with $\epsilon_1=0.01$ and $\epsilon_2=0.01$. First, this is applied to test data in which the two classes are relatively balanced, i.e. the skew $$\left(S = \frac{\text{negative}}{\text{positive}}\right)$$

is 1. The expected fraction of positives identified will be given by the expected value of the recall. This can be computed as 1-prob(missclassifying a positive instance)=1-$\epsilon_1$, i.e. 0.99. A key question in many applications is: What is the probability that a detected positive sample is indeed positive? This corresponds to the expected precision of the positive class and can be computed as $$\frac{1 - \epsilon_1}{1 - \epsilon_1 + \epsilon_2 s}.$$

For this case, the precision is expected to be 0.99. Next, let us consider how the skew (s) of the test data impacts the recall and precision for the same quality (sensitivity and specificity) classifier. The recall is not impacted by the skew in the data. However, for the same value of $\epsilon_1=0.01$ and $\epsilon_2=0.01$, as the skew between the classes in the test data increases, the precision of the test samples classified as positive decreases. For relatively balanced datasets with $1 < s < 10$, a range of $0.1 < \epsilon_2 < 0.01$ leads to a precision that is acceptable for the end users. However, for an acceptable precision when the positive class is ultra-rare, i.e. $100 < s < 10000$, the expected $\epsilon_2$ is so low that it is unachievable.

One approach to address the issue of low precision, is to use a very conservative classifier, i.e. a very low $\epsilon_2$. However, a very conservative classifier would also considerably lower the recall.

Combination Step—

In some of the present embodiments, a second step is performed in which we combine predictions from two sources to address the issue of low precision.

We present a simple combination strategy that takes the logical AND of two sets of predictions from two conditionally independent views to produce the combination output.

We prove that in the context of ultra-skewed classes, even this simple combination scheme leads to drastic improvements in performance measured as a combined function of precision and recall (such as geometric mean) because the increase in precision is higher compared to the loss in recall.

Often it is difficult to find two sufficient, conditionally independent views for most problems. However, we can still use the combination step even when we have access to only one view (feature set) on which we had trained our predictive model in the first step. One of the properties of weak labels used in the various embodiments is that they are often available for the entire test set. This is due to the fact that they are usually derived from raw features without using human effort. Thus, one embodiment uses the weak labels themselves as one set of predictions required for the combination step. The other set of predictions is from the predictive model trained on the feature set. One may wonder whether the two sets of predictions, one from the classifier (trained using weak labels) and other the weak labels themselves, satisfy the conditional independence assumption. If the conditional independence assumption made for step 1, i.e. the weak label a is independent of x given y is true, then the predictions from $(g(x), \gamma_g)$ are independent of a given y.

Proof

Given x is independent of a given y. This implies that for any function h(x), h(x) is independent of a given y. Let h(x) be the predictive model trained in step 1, i.e. $h(x)=g(x)>\gamma_g$. Then, predictions from $(g(x), \gamma_g)$ are independent of weak label a given y.

We also present a method to select the threshold $\gamma_g$ on g(x) such that it directly maximizes the performance (measured as G-measure) of the output of combination step. By definition, selecting the decision threshold to directly maximize G-measure of combination step will have a better performance compared to the approach in which the threshold of classifier is fixed to maximize G-measure of classifier and then these predictions are combined with imperfect labels.

Section 3—Guilt-By-Association Step

In most applications it is possible to collect additional data that captures relationship structures among test instances (members) such as people, transactions, or webpages. These relationships are represented as a graph G=(V, E) where the instances are the nodes and edges are the relationship between a pair of nodes. One such example is a social network, where the people are nodes and edges capture some social context such as their email communication, interaction on social media, or some activity in the virtual world. Similarly, in case of remote sensing data, we can assume a spatial neighborhood graph where the pixels are the nodes and edges capture spatial adjacency relationships.

For several ultra-rare class problems, the instances (nodes) of the positive class are more likely to be connected to other positive class nodes compared to negative class nodes in the graph G. This "linked" behavior among positive class nodes arises primarily due to the underlying phenomena of (1) propagation of a contagion (influence propagation, such as spread of disease or the spread of fire) or (2) tendency to socialize with similar people (homophily). As an example of influence propagation, consider the application of finding people with a particular contagious disease. Since the disease spreads when a person has a physical interaction with an infected person, an infected person will be connected to another infected person in an interaction-based graph, which may be derived from human mobility data. The phenomenon of homophily has been observed in the application of identifying people involved in some criminal activity. Previous studies have noted that criminals tend to socialize more often with other criminals and are likely to be connected to each other via a trust network, email network, etc.

To address the issue of poor recall in embodiments that use two classifiers in the second step discussed above, some embodiments leverage the "connectedness" of positive instances in an associations graph G. The key idea is to start with the highly confident set of positive instances, which have been identified using two classifiers in the second step, and increase the coverage of positive instances (recall) by probing instances along the association graph G. Such embodiments rely on the principle of guilt-by-association, i.e. though being connected to a positive instance is not sufficient proof to be flagged as positive, but it does invite further investigation. More specifically, every node connected to a node member of confident set S is reclassified using a classifier C. If the node is predicted as positive by C then that node is added to S. The label propagation is continued iteratively till no further nodes can be added. This step increases the recall of each positive group by adding members of the group that are correctly identified as positive by C but were missed by the more conservative step of combining multiple predictions.

An important point to note here is that the label propagation can occur only along the graph G. As a consequence, a group (cluster) that was completely missed in the second step cannot be included in this step. Thus, to ensure high recall in such embodiments, every group should have at least some (one or more) members that are identified in the second step. Mathematically this probability increases with the group size k and for very large groups it is close to 1. Thus, guilt-by-association step is more effective if the positive instances occur as large sized groups in graph G.

In summary, the method of one embodiment is shown in the flow diagram of FIG. 1. At step 400, highly-skewed data is received for a collection of members (objects). The data is highly skewed because the ratio of the number of members in a first class to the number of members in an ultra-rare second class exceeds one hundred. In accordance with one embodiment, the members are areas on the earth and the received data is image data collected by a satellite. At step 402, the received data is applied to heuristic rules to generate weak classification labels for at least some of the members. In accordance with one embodiment, the members are areas and the weak classification labels are either the rare class, burned, or the majority class, non-burned. In accordance with other embodiments, the members are people and the classification labels are either the rare class, sick, or the majority class, healthy. In still further embodiments, the members are computer network activities and the classification labels comprise the rare class, security breaches, and the majority class, normal network traffic. At step 404, the weak classification labels and the associated received data are used to train a classifier. At step 406, the trained classifier and the heuristics are used to classify each member such that a member is classified in an ultra-rare class only if both the trained classifier and the heuristics classify the member in the ultra-rare class. In accordance with one embodiment, the trained classifier requires more computations per classification than the heuristics. To improve computing efficiency, only those members that have been classified in the ultra-rare class by the heuristics are applied to trained classifier for classification. Thus, the trained classifier is not applied to all of the members. At step 408, a relationship or association graph is accessed. The relationship graph provides links or associations between various members in the collection of members. For instance, the links can indicate which areas on earth are next to other areas on earth. In other embodiments, the links can indicate physical contact between two people. At step 410, members that are associated with a member in an ultra-rare class by the relationship graph are reclassified. This reclassification can be done using the trained classifier or using a completely separate classifier. In accordance with one embodiment, the reclassification is done iteratively such when a member is reclassified into the ultra-rare class, the graph is consulted to identify members associated with the reclassified member and those members are then reclassified.

Section 4—Burned Area Exemplary Embodiment

Biomass burning is a major source of greenhouse gas emissions and has a significant footprint on the flora and fauna, and the air quality of the region. While monitoring fires in near-real time is critical for operational fire management, mapping historical fires (i.e. burned areas) is also important for a number of reasons, such as climate change studies (e.g., studying the relationship between rising temperatures and frequency of fires), and carbon cycle studies (e.g., quantifying how much $CO_2$ is emitted by fires is critical for emissions reduction efforts such as UN-REDD). Thus, there is a need for accurate and cost-effective burned area mapping techniques that provide earth scientists with the spatial extent and timing of fire events to enable research in the understanding of biomass burning and its impact on the global climate system.

Burned area maps can be produced using one of the two approaches: (1) surveys or (2) satellite products. Field-based surveys combined with aerial observations allow extremely detailed burned area mapping, but are limited in their spatial extent and temporal frequency due to the considerable human effort involved. The other approach is to develop satellite remote sensing-based techniques, such as those using data from NASA's Moderate Resolution Imaging Spectroradiometer (MODIS) instrument, which are available freely with regular, global wall-to-wall coverage. One of the techniques is to use a heuristic on the available datasets based on the domain expert's knowledge. As an example, a signal that captures thermal anomaly (active fire) is widely used as a surrogate for burn activity. This class of techniques require a domain expert to derive an accurate heuristic and more importantly these heuristics are imperfect and considerably inadequate to be directly used by the end-users. Another technique that involves significant human effort is based on manual inspection of the image composites from multi-spectral data collected by satellites. This technique involves considerable human effort from an expert who can distinguish burned areas in the composite images and is therefore infeasible for regularly updated global-scale burned area mapping. The state-of-the-art approaches are based on building predictive models on a discriminative feature space and then using these models to generate burned area products.

Burned area mapping can be formulated as a binary classification task where each pixel at every time step has to be classified into one of the two classes—burned and unburned. There are three major challenges in developing binary classification techniques for burned area mapping problem: (1) presence of heterogeneity in the data due to differences in geographies, seasons and land classes, (2) inavailability of "gold standard" labeled data for supervision in most parts of the world and (3) ultra-skew in the distribution of burned and unburned classes.

Data, Pre-Processing and Feature Extraction—

In accordance with one embodiment, burned area mapping is based on two remotely sensed composite data products from the MODIS instrument aboard NASA's Terra satellite, which are available for public download. Specifically, the embodiments use the Enhanced Vegetation Index (EVI) from the MODIS 16-day Level 3 1 km Vegetation Indices (MOD13A2) and the Active Fire (AF) from the MODIS 8-day Level 3 1 km Thermal Anomalies and Fire products (MOD14A2). EVI essentially measures "greenness" (area-averaged canopy photosynthetic capacity) as a proxy for the amount of vegetated biomass at a particular location. AF is a basic fire product designed to identify thermal anomalies from the middle infrared spectral reflectance bands and is used heavily in operational situations by fire-fighting agencies around the world. Additionally, the embodiments use MODIS land cover classification product (MCD12Q1) to get the land cover class of each pixel. MODIS Level 3 products are provided on a global 1 km sinusoidal grid.

The embodiments extract features from vegetation profile (EVI) of locations that can be used to distinguish between the burned and unburned pixels. Fire events burn down a considerable fraction of the leaf mass and are therefore expected to significantly decrease the vegetation index value (EVI) of the burned locations. In the embodiments, two EVI time series features are used to quantify the vegetation index change at any given time step.

Vegetation Difference score (V2D) is a vegetation index change statistic computed based on the significance of the change in annual mean of vegetation index around the time of an event. V2D score is expected to be higher when the EVI of the location is significantly lower for an entire year compared to the observed EVI for previous years such as in the case of fire locations at the time of the fire.

Local Instance Delta score (LID) is a vegetation index change statistic computed based on the significance of the change in vegetation index between two consecutive time steps. Since fire events cause an abrupt loss in EVI, the LID score is expected to be high for burned pixels at the time of a fire.

Figure 2:
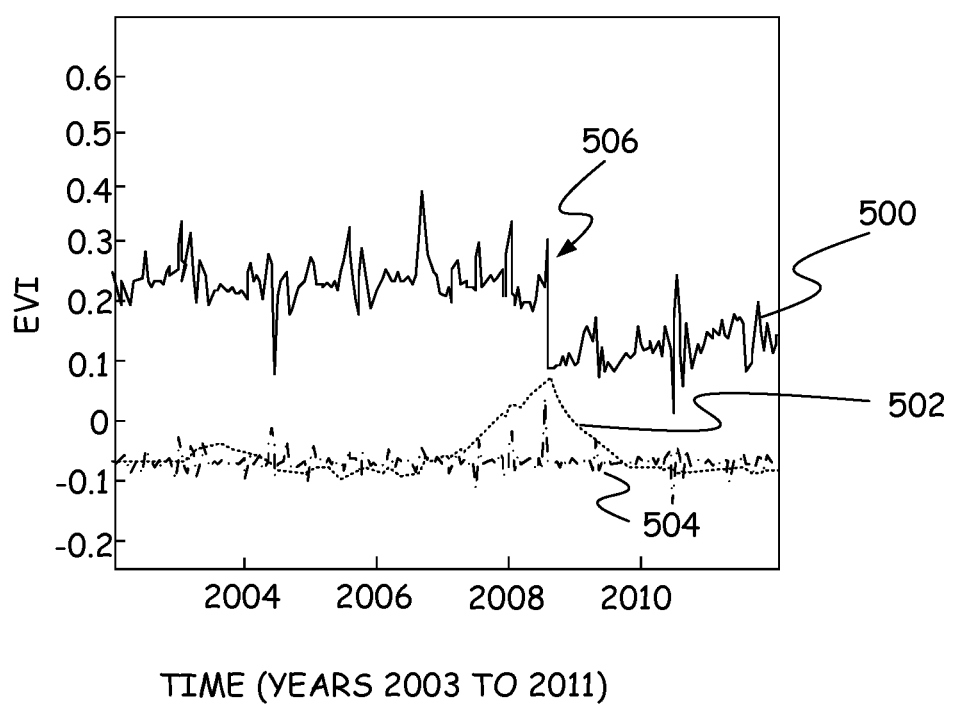
FIG. 2 shows graphs of satellite image values for an area over a period of time that includes a fire event.

FIG. 2 shows a graph 500 in solid of the EVI time series of an example burned location and graphs 502 and 504 of the time series of two vegetation index features—V2D (in dotted) and LID (in dot-dash). The point 506 is the date of a fire.

In some embodiments, domain expert given heuristic provides "weak labels" for both the training and event detection steps. Burned areas show significant rise in temperature at the time of a fire. To exploit this property we use MODIS Active Fire (AF) product as the domain heuristic that provides the "weak labels". AF is a Boolean variable that is true if a severe temperature anomaly is observed at a pixel on a given time step and false otherwise. Burned pixels are more likely to have an Active Fire signal on the date of a fire compared to other unburned pixels. However, due to uncertainty in data collection and the weak relation between burning and thermal anomaly, there are errors if AF is used as a surrogate for burning activity. Moreover, the sensitivity and specificity of AF varies across the geography and land cover.

In accordance with one embodiment, the following steps are performed:

1. Obtain highly-skewed global satellite data where the ratio of non-burned areas to burned areas exceeds one hundred.

2. Partitioned global data into homogeneous tasks based on geography and land cover.

3. Classify each area represented by the global satellite data as either a burned area or a non-burned area using a heuristic rule such as Active Fire to form an imperfect or weak label for each area.

4. Train a classifier for each task using the weak labels of a subset of the areas represented by the global data. The classifier is trained without knowing whether areas designated by the weak labels as burned areas are truly burned areas. In accordance with one embodiment, a separate classifier is trained for each homogenous set based on geography and land cover.

5. For a further plurality of areas, classifying the areas into burned or non-burned classes using the trained classifier. In accordance with one embodiment, the trained classifier requires more computations per classification than the heuristic rule. To improve computing performance, only those areas classified as burned areas by the heuristic rule are classified by the trained classifier.

6. Identify final burned areas using a combination of the trained classifier and the heuristic rule. In particular, an area is only classified as a final burned area if both the trained classifier and the heuristic rule classify the area as a burned area. This strategy considerably reduces the number of spurious detections at the cost of losing out possibly a large number of true positives.

7. Retrieve a graph showing areas neighboring final burned areas.

8. For each area classified as a final burned area, use guilt-by-association to expand coverage of the burned area. In particular, for each burned area, use the graph to select a neighboring area and reclassify the neighboring area as either a burned area or a non-burned area.

Figure 3:
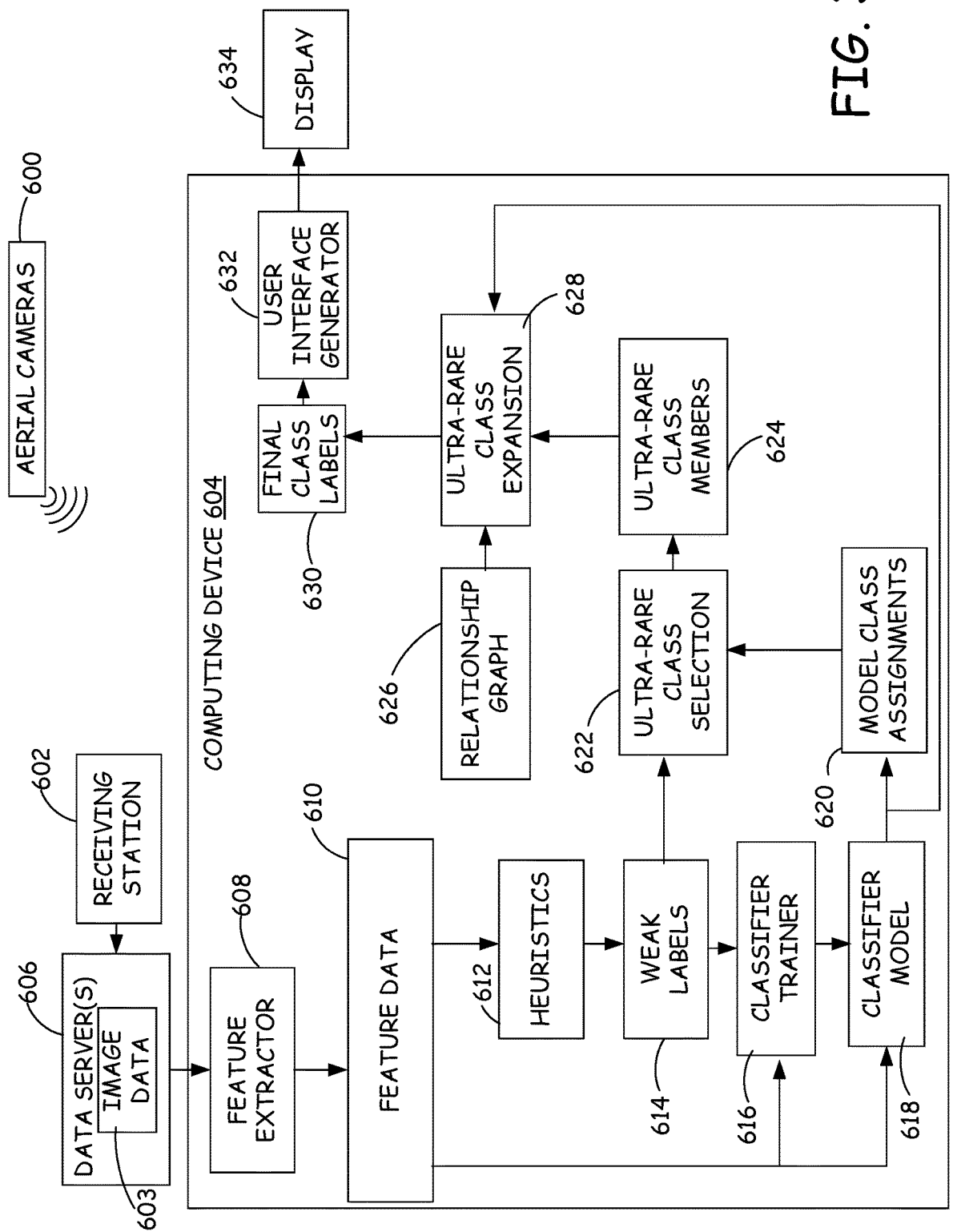
FIG. 3 is a block diagram of a system for classifying highly-skewed satellite data.

FIG. 3 provides a block diagram of a system in accordance with one embodiment. In FIG. 3, aerial cameras 600 capture images of multiple geographic areas on earth. The aerial cameras can include one or more sensors for each pixel and thus each pixel can be represented by a plurality of sensor values for each image captured by aerial cameras 600. Aerial cameras 600 can be positioned on an aircraft or on a satellite. The sensor data produced by aerial cameras 600 is sent to a receiving station 602, which stores the sensor data as image data 603 in data servers 606.

A processor in a computing device 604 executes instructions to implement a feature extractor 608 that retrieves image data 603 from the memory of data servers 606 and identifies features from image data 603 to produce feature data 610 for each area in each image. Feature extractor 608 can form the feature data 610 by using the image data 603 directly or by applying one or more digital processes to image data 603 to alter the color balance, contrast, and brightness and to remove some noise from image data 603. Other digital image processes may also be applied when forming feature data 610.

Feature data 610 is applied to heuristics 612, which assign weak labels 614 to each area represented by feature data 610. Some of weak labels 614 are provided to a classifier trainer 616 together with corresponding features from feature data 610. Classifier trainer 616 trains a classifier model 618 based on weak labels 614 and the features from feature data 610.

The features from feature data 610 are then applied to classifier model 618 to generate model class assignments 620. The model class assignments 620 are provided to ultra-rare class selection 622 together with weak labels 614. For each area, ultra-rare class selection 622 only assigns the area to the ultra-rare class, such as a burned area, if both the weak labels 614 and the model class assignments 620 indicate that the area should be classified in the ultra-rare class. The areas assigned to the ultra-rare class by ultra-rare class selection 622 are output as ultra-rare class members 624. The ultra-rare class members 624 are provided to ultra-rare class expansion 628, which uses relationship graph 626 and classification model 618 to reclassify members that are connected to the ultra-rare class members in relationship graph 626. The iterative process of ultra-rare class expansion 628 results in final class labels 630.

Final class labels 630 can be used by a user interface generator 632 implemented by a processor to generate a user interface on a display 634.

Figure 4:
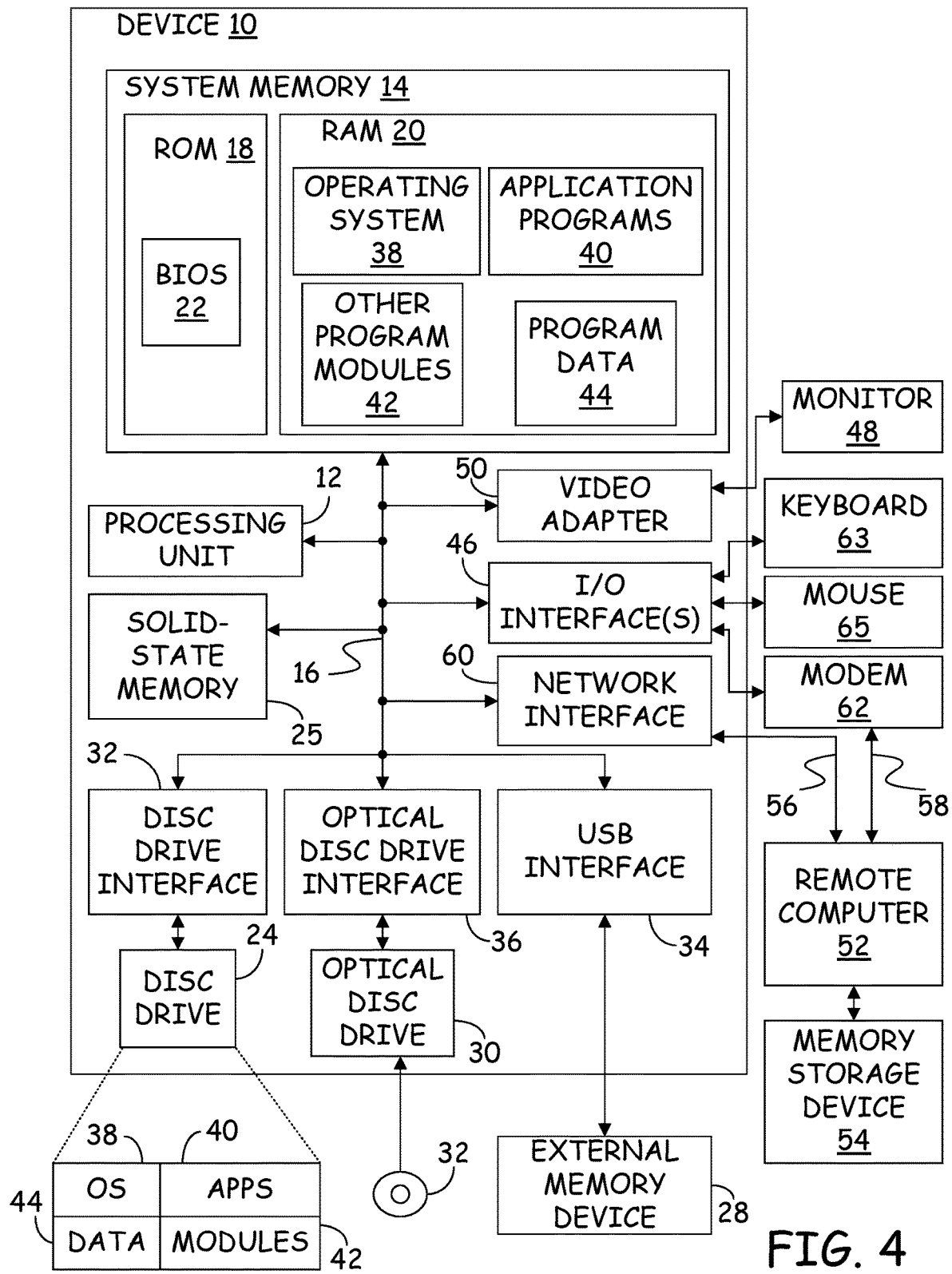
FIG. 4 is a block diagram of a computing system that can be used in the various embodiments.

An example of a computing device that can be used as computing device 604, data server 606, and receiving station 602 in the various embodiments is shown in the block diagram of FIG. 4. The computing device 10 of FIG. 4 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable storage media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for executing the methods described above. Program data 44 may include image data, feature data, class labels, and other data used in the methods described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 4. The network connections depicted in FIG. 4 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 4 are exemplary and other means for establishing a communications link between the computers, such as a wireless interface communications link, may be used.

Although the present invention has been described with reference to preferred embodiments, workers skilled in the art will recognize that changes may be made in form and detail without departing from the spirit and scope of the invention.

What is claimed is:

1. A method of improving computer-based classification of highly skewed data, the method comprising:
   receiving data comprising members that are in either a first class or a second class;
   classifying each member in the data using two separate classifiers such that a member is classified in the second class only if both classifiers place the member in the second class;
   identifying connections between the members;
   using the connections to identify members classified in the first class that are connected to members in the second class to identify members classified in the first class that require reclassification;
   for each member classified in the first class that requires reclassification, reclassifying the first class member as either being in the first class or the second class;
   when a member is reclassified from the first class to the second class, retrieving members connected to the reclassified member to identify additional members of the first class that require reclassification; and
   for each additional member identified as requiring reclassification because the additional member was classified in the first class and is connected to a member reclassified from the first class to the second class, reclassifying the additional connected member of the first class as either being in the first class or the second class.

2. The method of claim 1 wherein receiving the data comprises receiving the data without an indication of the true class of any of the members in the data.

3. The method of claim 1 wherein the members comprise people and the classes comprise sick people and healthy people.

4. The method of claim 3 wherein identifying connections between the members comprises identifying people who have come in contact with each other.

5. The method of claim 1 wherein the members comprise network activities and the classes comprise security breaches and normal network traffic.

6. The method of claim 1 further comprising:
   applying a heuristic to the data to generate a weak class label for all the members; and
   using the weak class labels for the members in the set of members to train one of the two separate classifiers.

7. The method of claim 6 wherein the other of the two separate classifiers comprises the heuristic.

8. The method of claim 6 wherein classifying each member in the data using two separate classifiers comprises classifying each member using the heuristic and using the trained classifier to classify only those members classified in the second class by the heuristic.

9. The method of claim 1 wherein each member comprises an area on the globe, the first class comprises unburned areas and the second class comprises burned areas.

10. The method of claim 1 wherein the data is highly skewed data such that the ratio of the number of members in the first class to the number of members in the second class is greater than one hundred.

11. A computing device comprising:
    a memory; and
    a processor configured to execute instructions to perform steps comprising:
      receiving data comprising members that are in either a first class or a second class;
      classifying each member in the data using two separate classifiers such that a member is classified in the second class only if both classifiers place the member in the second class;
      identifying connections between the members;
      using the connections to identify members classified in the first class that are connected to members in the second class to identify members classified in the first class that require reclassification;
      for each member classified in the first class that requires reclassification, reclassifying the member of the first class as either being in the first class or the second class;
      when a member is reclassified from the first class to the second class, retrieving members connected to the reclassified member to identify additional members of the first class that require reclassification; and for each additional member identified as requiring reclassification because the additional member was classified in the first class and is connected to a member reclassified from the first class to the second class, reclassifying the additional member of the first class as either being in the first class or the second class.

12. The computing device of claim 11 wherein receiving the data comprises receiving the data without an indication of the true class of any of the members in the data.

13. The computing device of claim 11 wherein the members comprise people and the classes comprise sick people and healthy people.

14. The computing device of claim 13 wherein identifying connections between the members comprises identifying people who have come in contact with each other.

15. The computing device of claim 11 wherein the members comprise network activities and the classes comprise security breaches and normal network traffic.

16. The computing device of claim 11 wherein the processor is configured to perform further steps comprising:

applying a heuristic to the data to generate a weak class label for all the members; and using the weak class labels for the members in the set of members to train one of the two separate classifiers.

17. The computing device of claim 16 wherein the other of the two separate classifiers comprises the heuristic.

18. The computing device of claim 16 wherein classifying each member in the data using two separate classifiers comprises classifying each member using the heuristic and using the trained classifier to classify only those members classified in the second class by the heuristic.

19. The computing device of claim 11 wherein each member comprises an area on the globe, the first class comprises unburned areas and the second class comprises burned areas.

20. The computing device of claim 11 wherein the data is highly skewed data such that the ratio of the number of members in the first class to the number of members in the second class is greater than one hundred.

* * * * *